United States Patent
Flores et al.

(10) Patent No.: US 10,044,939 B2
(45) Date of Patent: Aug. 7, 2018

(54) SYSTEMS AND METHODS FOR CAMERA OPERATION THROUGH CONTROL DEVICE

(71) Applicants: Sony Corporation, Tokyo (JP); Sony Network Entertainment International LLC, Los Angeles, CA (US)

(72) Inventors: Prisciliano Flores, Spring Valley, CA (US); Charles McCoy, Coronado, CA (US); True Xiong, San Diego, CA (US); Yuqian Zhao, San Diego, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 25 days.

(21) Appl. No.: 14/491,413

(22) Filed: Sep. 19, 2014

(65) Prior Publication Data
US 2016/0088230 A1 Mar. 24, 2016

(51) Int. Cl.
*H04N 5/232* (2006.01)
*H04N 7/18* (2006.01)

(52) U.S. Cl.
CPC ..... *H04N 5/23296* (2013.01); *H04N 5/23203* (2013.01); *H04N 5/23216* (2013.01); *H04N 5/23293* (2013.01); *H04N 7/183* (2013.01)

(58) Field of Classification Search
CPC ......... H04N 5/23203; H04N 2007/145; H04N 2101/00; H04N 7/142; H04N 7/183;
(Continued)

(56) References Cited

U.S. PATENT DOCUMENTS

| | | | | |
|---|---|---|---|---|
| 6,532,035 B1* | 3/2003 | Saari | ..................... | G02B 13/005 |
| | | | | 348/14.01 |
| 6,992,699 B1* | 1/2006 | Vance | ..................... | H04N 7/142 |
| | | | | 348/207.99 |

(Continued)

FOREIGN PATENT DOCUMENTS

| | | |
|---|---|---|
| EP | 1345421 A3 | 11/2004 |
| WO | 2007130146 A1 | 11/2007 |
| WO | 2011059246 A2 | 5/2011 |

OTHER PUBLICATIONS

Author Uknown, "DSLR Controller", downloaded at: http://dslrcontroller.com/. Release Date Aug. 12, 2011, 1 page.
(Continued)

*Primary Examiner* — Hung Lam
(74) *Attorney, Agent, or Firm* — Mayer & Williams PC

(57) ABSTRACT

Provided are ways in which a camera can be operated by a control device. Such provides a convenient solution whenever, e.g., two friends, each with a cell phone, wish to take a well-composed impromptu group picture. The "camera" may be any type of camera, which can be coupled to the control or monitoring device. Typical cameras include those associated with mobile devices, such as cell phone cameras, but also dedicated cameras with transceiver functionality. The control device is often a mobile device such as a cell phone, but can also be a dedicated monitoring device. In one implementation, the control device can control the direction of view, the field of view, and shutter operation, and provide to the user an image of the current view seen. In this implementation, the user may control most significant aspects of camera composition, as well as initiating the capture of the image.

26 Claims, 6 Drawing Sheets

(58) Field of Classification Search
CPC ......... H04N 1/00307; H04N 21/41407; H04N 21/42202; H04N 21/4223; H04N 2201/0084; H04N 5/232; H04N 7/147; H04N 7/185; H04N 1/004
USPC ........... 725/105; 348/207.99, 211.99, 333.02
See application file for complete search history.

(56) References Cited

U.S. PATENT DOCUMENTS

| | | | |
|---|---|---|---|
| 2002/0180878 A1* | 12/2002 | Iida | H04N 5/23203 348/333.02 |
| 2004/0046871 A1* | 3/2004 | Ichikawa | H04N 5/23203 348/207.99 |
| 2005/0012824 A1* | 1/2005 | Stavely | H04N 5/23216 348/211.99 |
| 2005/0099500 A1* | 5/2005 | Fujita | H04N 5/23206 348/207.99 |
| 2006/0197863 A1* | 9/2006 | Kim | H04M 1/0264 348/335 |
| 2007/0109417 A1* | 5/2007 | Hyttfors | H04N 5/232 348/211.99 |
| 2007/0254640 A1* | 11/2007 | Bliss | H04M 1/72533 455/420 |
| 2009/0189981 A1* | 7/2009 | Siann | H04N 7/183 348/143 |
| 2013/0223834 A1* | 8/2013 | Jikihara | G03B 11/00 396/448 |
| 2013/0321607 A1* | 12/2013 | de Boucherville | H04N 5/23206 348/77 |
| 2014/0348498 A1* | 11/2014 | Aiba | G03B 13/32 396/20 |
| 2015/0198866 A1* | 7/2015 | Huang | G03B 17/02 348/151 |
| 2017/0009969 A1* | 1/2017 | Conti | H04N 5/23206 |

OTHER PUBLICATIONS

Author Uknown, "Review: Sony's Cyber-shot QX10 wireless camera lens for iPhone", downloaded at http://appleinsider.com/articles/13/09/29/review-sonys-cyber-shot-qx10-wireless-camera-lens-for-iphone. Publication Date Sep. 29, 2013, 25 pages.
Author Unknown, "New Swivl "robotic cameraman" will support tablets and SLRs. Have a say in the feature set?" Downloaded at: http://www.imaging-resource.com/news/2013/01/11/swivl-robotic-cameraman-supports-tablets-and-slrs, Publication Date Jan. 11, 2013, 1 page.
Author Unknown, "Live-View Remote—Model: RM-LVR1" download at http://www.sony.net/Products/actioncam/en-us/support/LVR/RM-LVR1/ Publication Date: 2014, 2 pages.
Author Unknown, Sony Live-View Remote Handbook, 16 pages, copyright 2014.
Author Unknown, "Live-View Remote Operating Instructions", 2 pages, copyright 2013.
Author Unknown, "Live-View Remote Set-Up Guide", 2 pages, copyright 2013.
Author Unknown, "Digital HD Video Camera Recorder", 2 pages, copyright 2013.
Author Unknown, "Handbook Digital HD Video Camera Recorder", 60 pages, copyright 2012.

* cited by examiner

SYSTEMS AND METHODS FOR CAMERA OPERATION THROUGH CONTROL DEVICE

FIELD OF THE INVENTION

The invention relates to controlling cameras, and in particular for controlling the operation of cameras remotely.

BACKGROUND

In the past, taking photographs of friends or family members with traditional cameras generally meant the photographer was not in the picture, as someone was required to "press the button" on the camera. This problem was solved by the development of "time delay" or self-timer functionality on cameras, which allowed the photographer to frame the shot, start the timer, and then step into the picture prior to the shutter activation. The photographer would mount the camera on a tripod or just place the same on a ledge, with the subjects appropriately framed and focused. This system was also used to remove shaking, as the shutter could be activated without the photographer having to depress the shutter button.

The advent of cell phone cameras and their subsequent and dramatic increase in resolution and capabilities have led to such cameras being the de facto standard for many consumers. However, due to their form factor and shape, such cameras are generally less easy to position, and are much more difficult to mount on a tripod or place on a ledge.

Other disadvantages include that the camera might not always be positionable such that it is convenient to see the display to decide if the shot is framed properly. Some cameras have displays that can move to allow them to be viewed from other angles, but still such have limits, especially when the user wishes to be located somewhere other than right next to the camera, e.g., when the user wants to be in the picture.

One attempt to solve such issues is by the use of a cell phone camera in which the camera is on the same side as the display screen; however, such cameras have been of significantly lower resolution than those in which the camera is facing away from the display screen.

Security cameras are known which allow cameras to be controlled remotely by a user who can see the video captured by the camera. However, such are generally proprietary specialized systems and lack at least features such as portability.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Systems and methods according to present principles provide ways in which a camera can be operated through an interface on a control device. The images captured may be still or video. Despite the significant functionality, systems and methods according to present principles may be employed in the context of traditional cameras and with cameras built into devices such as cell phones or other easy-to-obtain off-the-shelf consumer electronic devices. In this way the systems and methods provide an affordable and convenient solution whenever, e.g., two friends, each with a cell phone, wish to take a well-composed impromptu group picture.

The term "camera" is used here to mean any type of camera, which can be signally or informationally coupled to the monitoring device, such as via Bluetooth®, infrared, or other sorts of electromagnetic fields. Wired couplings are also envisioned. Typical cameras under this definition include those associated with mobile devices, such as cell phone cameras, but also dedicated cameras with transceiver functionality (at least for transmitting of images and receiving of control signals).

The term "control device" is used here to mean any type of device which can control at least in some way operation of the camera device. The control device is often a mobile device such as a cell phone, but can also be a dedicated monitoring device, such as a remote control. Generally, the control device can view a scene as imaged by the camera, and can control at least shutter operation of the camera (although variations of such functionality will be understood). In other implementations, the control device can manage the direction the camera is pointing, termed herein "direction of view". In yet other implementations, the control device can manage the field of view and zoom. Besides controlling shutter operation, direction of view, and field of view, the control device can in some implementations also control photographic parameters such as f-stop, shutter speed, aperture, focus, light effects, film speed, shooting mode, and the like. The control device can further be enabled to control time delay functionality, photo file management, and backup image storage, and so on.

For example, in one implementation, the control device can control the direction of view, the field of view, and shutter operation, as well as providing to the user an image of the current view seen by the camera. The image of the current view can be of the same resolution as that of the camera (or lesser), e.g., a thumbnail. The use of a thumbnail may allow sufficient guidance to the photographer on the current shot, while minimizing bandwidth needs. In this implementation, the user (himself or herself, or as part of a group of photographic subjects) may control most significant aspects of camera composition, as well as initiating the capture of the image.

In a related implementation, the control device can control shutter operation, as well as providing to the user an image of the current view seen by the camera (as described above). In this implementation, the user may be enabled to frame a shot and to initiate the capture, but if changes are needed to the composition, the user or group may generally have to manually make such changes, either by moving the camera or by moving the group.

In yet another implementation, the control device may provide a remote capability just for shutter operation.

In any implementation, the control device and/or camera may incorporate a time delay such that the user is given a few moments to put away the control device, so the same is not visible in the final image. For example, the time delay may be 10 seconds, 5 seconds, 2 seconds, 1 second, and so on.

In one implementation, a camera can be operated through an interface on the control device. The camera may be positioned on a surface by a user, framing several subjects. The user then joins the subjects, and using an image on the control device directs the subjects where to pose as the user stands with them. The user may then zoom the camera appropriately to frame everyone in the image properly (or control other parameters as well). The user may then press a button on the control device to turn on a short self timer on the camera and then hold the control device out of sight. The camera captures the picture, and the picture taken can be reviewed on the control device's screen to ensure that the picture was captured as intended, that it was properly focused, and that no subjects blinked. If it is desired to take the picture over again, such may be done before any subjects move out of place.

Such systems and methods according to present principles have significant advantages over prior cameras. For example, baby monitors, "nanny cams", and security cameras are traditionally dedicated devices that do not enjoy the portability or usability of cell phones. In the case of security cameras, such are generally mounted in particular locations and are thus not portable. In fact, the point of a security camera is to view a scene from a different location, whereas many implementations of present principles are for situations when a user is in the same location as the camera, but just wants to appear in the picture.

In one implementation, the invention is directed towards a method for remotely operating a camera within a housing, including: transmitting an image from a camera for display at a control device, the image indicating a current view; receiving a first control signal from the control device; adjusting the current view according to the first control signal by controlling a camera parameter; receiving a second control signal from the control device, the second control signal requesting an image acquisition; and causing an acquisition of an image.

Implementations of the invention may include one or more of the following. The method may further include transmitting the acquired image to the control device. The steps may be performed by an application running on the camera. The adjusting may include controlling a native operating system of the camera or controlling a camera operation application running on the camera. The first control signal may be configured to adjust the current view by adjusting either pan, tilt, or zoom, or a combination. The adjusting may be performed by moving a lens relative to an image sensor and the housing. The adjusting may be performed by moving the camera relative to the housing. The first control signal may be configured to adjust the current view by adjusting a parameter selected from the group consisting of: shutter speed, aperture, angle of view, field of view, position, depth of field, focus, ISO sensitivity, exposure compensation, flash operation, digital processing, or combinations of these. The digital processing may include, e.g., selecting vivid color mode or HDR mode. The flash operation may include, e.g., selecting on, off, auto, or brightness compensation. The receiving a second control signal and the acquiring may be separated by a predetermined period of time, such as between about 2 and 10 seconds.

In a related aspect, the invention is directed towards a non-transitory computer-readable medium, including instructions for causing a computing environment to perform the method above.

In another aspect, the invention is directed towards a method for remotely operating a camera, including: receiving an image from a camera, the image indicating a current view; displaying the received image; transmitting a first control signal to the camera, the first control signal adjusting a parameter of the camera; receiving an updated image of the current view as modified by the adjusted parameter caused by the first control signal; and receiving an input and in response to the input transmitting a second control signal to the camera, the second control signal requesting an image acquisition.

Implementations of the invention may include one or more of the following. The method may further include receiving the acquired image from the camera. The first and second control signals may be configured to deliver commands to a native operating system of the camera. The first and second control signals may be configured to deliver commands to an application operating the camera. The first and second control signals may be transmitted at least in part by an application running on a control device. The first and second control signals may be transmitted at least in part by a native operating system of a control device. The first control signal may be configured to adjust operation of the camera by adjusting a parameter selected from the group consisting of: zoom, shutter speed, aperture, angle of view, field of view, position, pan, tilt, depth of field, focus, ISO sensitivity, exposure compensation, flash operation, digital processing, or combinations of these. The method may further include transmitting the second control signal a predetermined period of time following the receiving an input, such as between about 2 and 10 seconds.

In a related aspect, the invention is directed towards a non-transitory computer-readable medium, including instructions for causing a computing environment to perform the method above.

In another aspect, the invention is directed towards a system, including a first non-transitory computer readable medium, including instructions for causing a camera to perform the following steps: receiving a first control signal from a control device; adjusting operation of the camera according to the first control signal; and receiving a second control signal from the control device, the second control signal requesting an image acquisition. The system also includes a second non-transitory computer readable medium, including instructions for causing a control device to perform the following steps: receiving an image from the camera; displaying the image from the camera; providing a user interface to receive a first input, the first input to adjust the operation of the camera; transmitting the first input as the first control signal to the camera; providing a user interface to receive a second input, the second input to cause the camera to acquire an image; transmitting the second input as the second control signal to the camera; receiving the acquired image from the camera; and displaying the acquired image from the camera.

Implementations of the invention may include one or more of the following. Either the camera or the control device, or both, may be a mobile phone or may be part of a mobile phone. The camera and the control device may be on a common network or maybe in data communication via a radio frequency communication scheme.

Advantages of certain implementations of the invention may include one or more of the following. Cameras may be operated remotely, including remote image viewing, and without the user touching the camera, and thus not negatively affecting the image being captured. Remote camera operation may be employed not only when a user desires to be in a photograph, but also where A user desires to be away from the camera for any reason. For example, the camera may be disposed in a dangerous location. For these purposes, the user may purchase an inexpensive cell phone with camera or dedicated camera and place the same in the desired location. Remote camera operation may be employed, where, e.g., a user is lifting the camera above the heads of a crowd, and thus can not see the display screen or the viewfinder.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

Like reference numerals refer to like elements throughout. Elements are not to scale unless specifically noted.

DETAILED DESCRIPTION

As an initial matter, it is noted that the terms "shutter", "shutter activation", and the like are used below in the context of acquiring or capturing an image, i.e., "taking" a picture or video. Such terms are intended to encompass any known or future developed ways of capturing images, including the use of mechanical shutters, electronic shutters, e.g., global or rolling, or the like. While systems and methods disclosed may be especially appropriate for digital photography, the same may also be adapted for analog photography by transmitting an image from an analog camera viewfinder and employing a control scheme for the analog camera controls.

Figure 1:
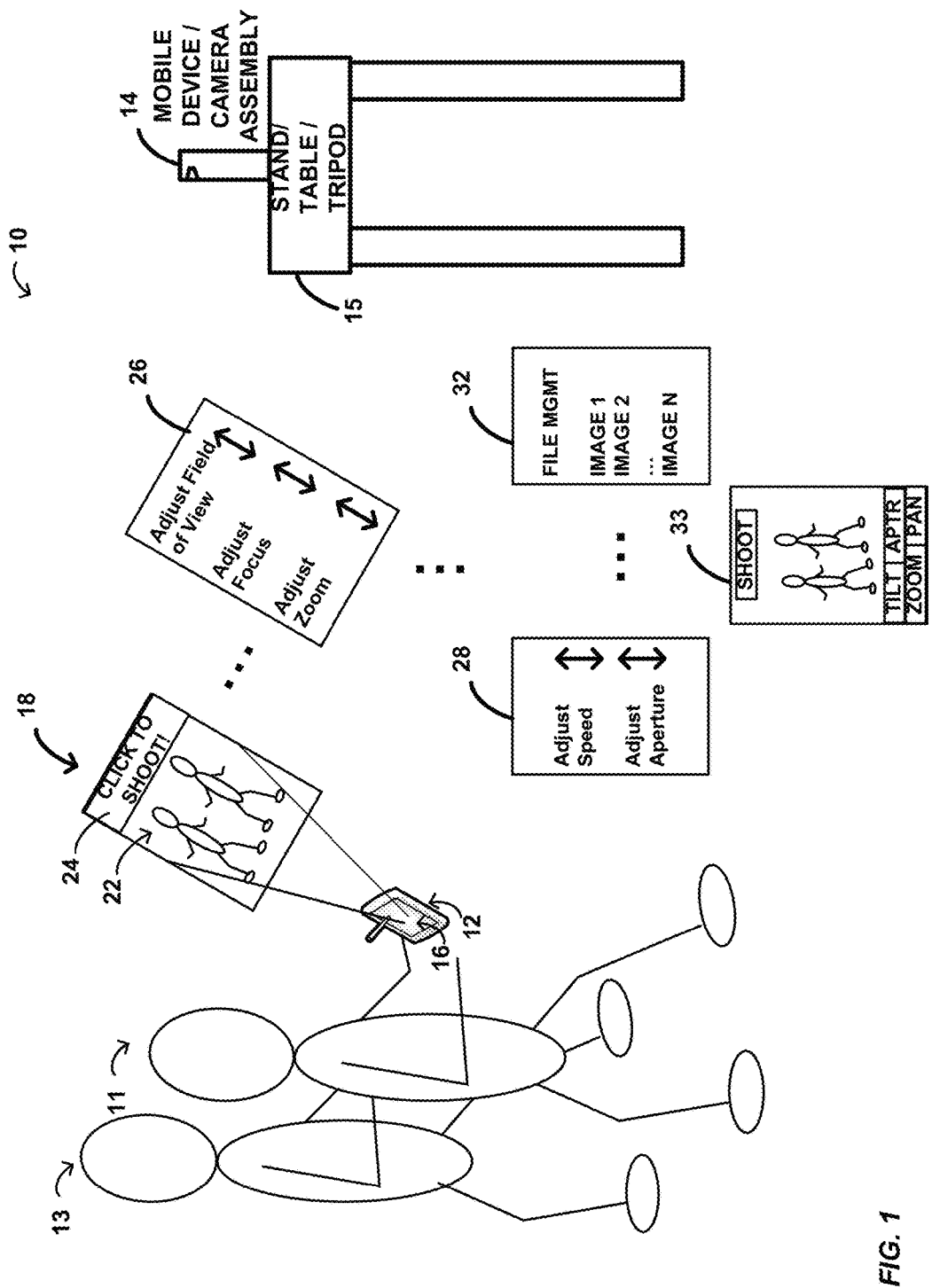
FIG. 1 illustrates schematically an exemplary arrangement according to present principles, including a camera and a control device.
Figure 2:
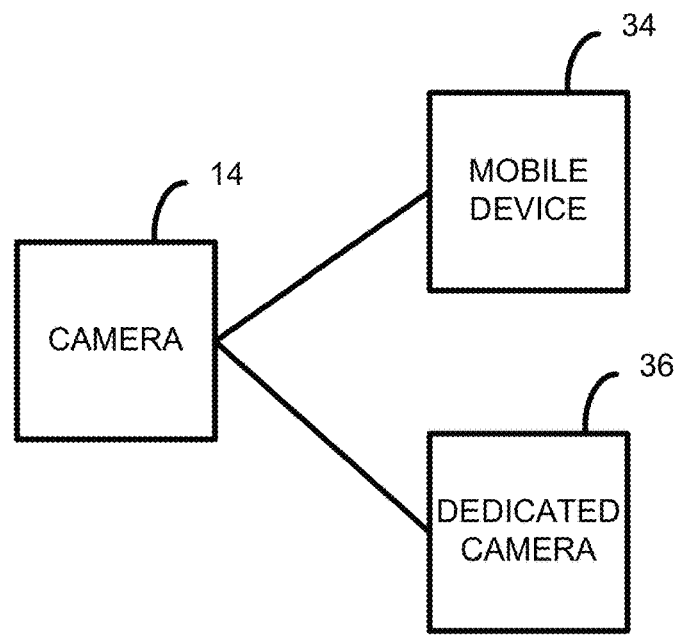
FIG. 2 illustrates exemplary types of cameras.

FIG. 1 illustrates an implementation of a system 10 according to present principles. In the figure, a user 11 is operating a control device 12, and standing with another subject 13 to be photographed, and they are together facing a camera 14. More particularly, they are facing a camera assembly 14, where the camera (see FIG. 2) may be part of a mobile device 34 such as a cell phone, tablet computer, laptop computer, or the like, or may alternatively be a dedicated device such as a camera 36 per se. In some cases, a traditional camera may be retrofitted with a controller according to present principles, allowing traditional cameras, including film based cameras, to take advantage of present principles. Referring back to FIG. 1, the camera 14 is illustrated on a stand 15, although it will be understood that the camera 14 may be placed anywhere. In many cases, users may take advantage of a nearby table, ledge or gate on which to place a camera for subsequent photography. It should be noted that according to present principles, a motorized tripod may also be employed, and in these cases the control device may send signals to a servo or other motor on the motorized tripod to accomplish present principles.

Figure 3:
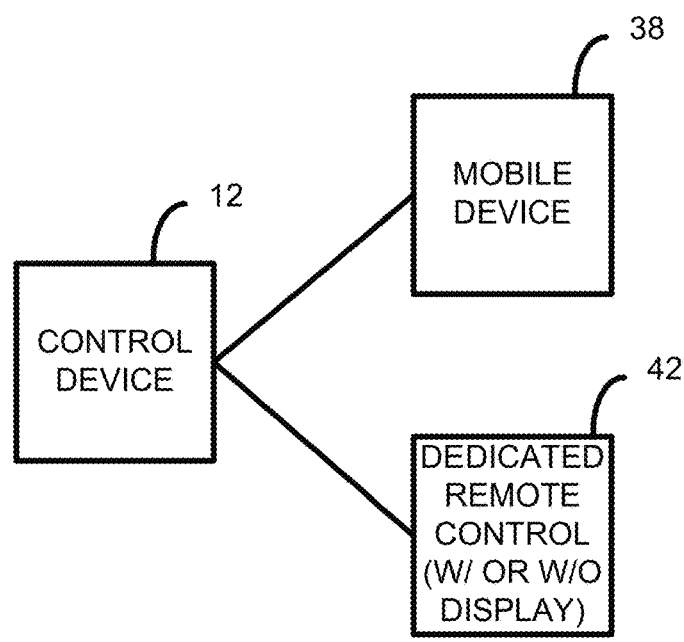
FIG. 3 illustrates exemplary types of control devices.

The control device 12 has a display 16, which in many cases also forms a portion of a user interface. For example, the display 16 may be used to display images from the camera 14, and the display 16 may also incorporate a touch screen user interface to allow control of camera parameters. Referring to FIG. 3, the control device 12 may form a portion of a mobile device 38 or alternatively may be embodied by a dedicated remote control 42. The dedicated remote control may or may not have its own display. For example, as described below, the actual display can be sent to another screen, e.g., a large screen TV. The control device may in some cases simply be a display with touchscreen controls wirelessly coupled to the camera (and configured for remote camera operation).

Using the control device, the user can monitor the view of the camera through a screen on a device other than the camera itself, and can further control various camera parameters.

Referring again back to FIG. 1, the control device 12 is illustrated with several exemplary display screens, each displaying a type of user interface. From this disclosure, it will be understood that the displayed user interfaces are purely exemplary, and that other user interfaces may also be enabled, as well as combinations of the disclosed ones.

As a first example, a user interface 18 may include a display of an image 22 from the camera 14. The image displayed on the user interface 18 may be the same image as seen by the camera, e.g., with equivalent resolution, or may be of lesser resolution, e.g., may be a thumbnail. One purpose of the image displayed on the user interface 18 is to provide a guide for composition, and thus a thumbnail or lower resolution image may suffice, particularly where the same are advantageous for bandwidth purposes. However, where the image displayed on the user interface 18 is being employed for focusing, light metering, depth of field, or the like, a high-resolution image may be preferred, and in some cases may be the same resolution image as seen by the image sensor on the camera 14.

The user interface 18 may also include a button 24 for activation of the shutter on the camera 14. In many cases, it may be preferable to allow a self-timer or delayed activation feature. That is, upon selection of the button 24, the control device 12 may delay sending a signal to the camera 14 causing shutter activation and thus image acquisition. Alternatively, the control device may send a signal to the camera 14 immediately, and a time delay may occur in the camera 14 itself. In yet another implementation, no time delay may be necessary. One purpose of the time delay is to allow the user to put away the control device so the same does not appear in the acquired image. In some implementations, it may be preferable to have the time delay occur in the camera 14, as the act of moving the control device 12 out of the picture may inadvertently cause the same to move out of range of the camera 14, in which case the camera 14 may never receive the delayed signal.

Other exemplary user interfaces 26, 28, 32, and 33 are also shown, and as noted, these may be cycled through as different user interfaces (along with the user interface 18), each may be available via a menu system, or via other equivalent techniques. The user interface 26 adjusts other aspects related to a current picture-taking environment, including a field of view, a focus, a zoom, or the like. Similar sorts of aspects adjustable using such a user interface include angle of view, pan, tilt, or the like. A user interface 28 is illustrated in which yet other camera parameters are controllable or adjustable, e.g., shutter speed, aperture (f-stop), or the like. For certain functionality, such as aperture or shutter speed, the result of changing such parameters may not be readily apparent without a photo being taken, although in certain cases the results can be simulated in software. A user interface 32 is illustrated pertaining to file management, in which various functionality may be enabled pertaining to individual image files, including editing, deletion, copying, uploading, or the like. For example, the display 16 may be used to browse images (still and video) already taken by the camera where the browsing occurs on the other device. The control device may in some cases store a copy of the pictures and video, e.g., those images and videos captured while the control device was controlling the camera. Other functionality may also be enabled, e.g., shooting mode, or the like. For video shots, functionality would be employed, such as video record start and stop. A combination user interface 33 is also illustrated in which an image is displayed along with certain controls such as pan, tilt, aperture, and zoom. A shoot button initiates shutter activation.

As will be described in greater detail below with respect to FIG. 6, the control device may also control pan and tilt of the camera. This may be accomplished in a number of ways. First, the control device may be configured to control a motorized tripod on which the camera is mounted. Second, pan and tilt may be controlled by moving the entire camera mechanism within the camera device, such that the body or housing of the camera assembly or device does not move. For example, the camera mechanism within a cell phone may be caused to move, by appropriate servomotors, without moving the cell phone itself. In yet another implementation, a pan and tilt may be controlled by adjusting a pan and tilt lens mechanism, so that neither the camera body/housing nor the image sensor move. In yet another implementation, pan and tilt may be accomplished entirely in software, although in such cases the updated image will generally always be at most a subset of the original image. In this implementation, pan and tilt is accomplished by cropping a subset of the original image, and then rotating and resizing to provide a desired updated image.

In more detail, by adding a pan and tilt lens mechanism to the camera, the view can be adjusted by adjusting the pan or tilt lens, without moving the image sensor and without moving the camera or cell phone body. Since the plane of the image sensor does not move, parallel lines (that are in a plane that does not intersect the plane of the image sensor) continue to run parallel to each other in the resulting image, even as the view is moved up, down, left, and/or right. For example, the camera may be lined up such that pillars on a front of a building look parallel in an image. If the camera is tilted up to include the top of the building in the image, then the pillars may no longer look parallel, as they would not be in a plane that is parallel to the plane of the image sensor. If instead the elements of a pan and tilt lens mechanism are adjusted, without moving the image sensor, the view can be adjusted to include the top of the building while still keeping the pillars on the front of the building parallel.

By providing a pan and tilt functionality, the camera portion can pan and tilt relative to the camera's body so that the camera body does not need to move to adjust the camera's view. This functionality allows the camera to be set down and then to have the view adjusted remotely without moving the body of the camera. In this way, the camera can be used without needing to carry a tripod or other support for the camera, and further negating the need to find a flat surface that is properly aligned with the one or more subjects to set the camera on. This may be particularly important for systems and methods according to present principles involving cell phones, as if the cell phone is just propped up on or against the nearest surface, e.g., against a post or on the hood of a car, the servo system can be employed to adjust the view to that desired.

As noted above, in another implementation, the camera or camera assembly/device can be attached to a more traditional tripod or support where the support is motorized with appropriate servomotors for pan and tilt, and the support is controlled by communications from the control device or from the camera itself that is attached to the support. In this latter implementation, the control device communicates with the camera as to how the camera should be moved, and the camera than communicates with the motorized tripod (on which it is mounted) to accomplish the requested movements.

The connection between the control device and the camera is generally such that the camera can be controlled and monitored through the control device. This can be accomplished through existing wireless technologies, such as Bluetooth®, infrared, cellular, NFC, Wi-Fi, or the like. In one implementation, the camera device can act as a Wi-Fi network source. The images that would normally be displayed on the camera's display are displayed, instead of or in addition to, on the control device's display. In yet another implementation, the images may be sent to a content playback device for display. For example, a camera can be controlled by a control device, but the image from the camera may be displayed on a large screen TV, to allow significant detail to be seen and adjusted. Such may be particularly advantageous when the control device has a smaller display screen, which does not convey all the detail needed for image adjustment.

Figure 4:
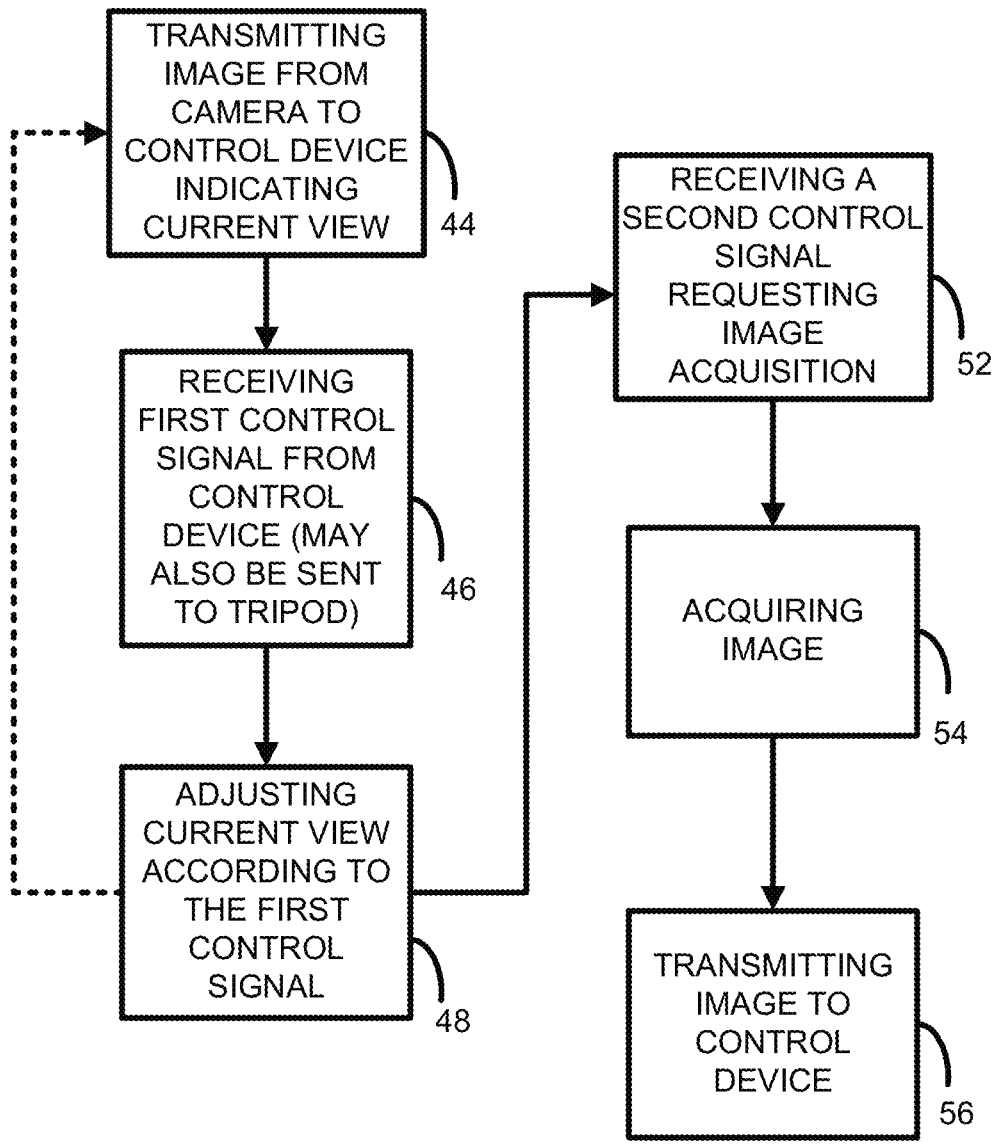
FIG. 4 is a flowchart of an exemplary method according to present principles, in particular illustrating camera operation.

FIG. 4 illustrates a flowchart 20 of an exemplary method according to present principles. In a first step, the camera and control device are positioned and an image is transmitted from the camera to the control device indicating a current view (step 44). For example, a cell phone camera may be set on a ledge such that a camera application is imaging a current view. In the case where a dedicated camera device is being controlled, a native operating system of the camera (and often not an application) would generally be that which is interfaced to for control by the control device. The camera application or native operating system would be configured such that control of the same is allowed by a wireless (or wired) communication from a control device, with appropriate permissions set. A control application may be instantiated on the control device, and the same configured to communicate with the camera application or native operating system of a dedicated camera. In many cases, once such camera and control applications are appropriately configured, the same may immediately perform a handshaking operation upon instantiation. Additional details of such applications and native processes are discussed in greater detail below.

From the standpoint of the camera, a next step is that a first control signal is received (step 46). The first control signal is generally received in response to a user viewing the transmitted image, in order to adjust a parameter of the image, e.g., composition, field of view, angle of view, or the like. In the case where a motorized tripod is employed, the first control signal may be sent to the motorized tripod. In some cases, a signal may be sent to a motorized tripod, but if the same is not able to perform the actions called upon by the first control signal, or is only partially able to do so, then the commands may be sent to the camera for subsequent parameter configuration (either to perform all of the steps called for by the first control signal, or to perform those steps not able to be performed by the motorized tripod).

In response to the first control signal, the current view is adjusted (step 48). This may be in any of the ways noted above, including movement of a motorized tripod or adjustment of parameters within the camera. The adjustment of the parameters may be in software, hardware, and/or may be accomplished physically by motors, e.g., servomotors, as well as motors controlling lens configurations, image sensor positions, and the like.

These steps of reviewing a transmitted image and adjusting camera parameters in response thereto (dotted line) may in some cases be repeated one or more times until a desirable image is portrayed on or caused by the control device. At this point a second signal may be sent from the control device to the camera, requesting image acquisition (step 52). In other words, the second signal causes shutter activation and capture of an image. In an implementation for video shots, an equivalent step caused by the second signal would be to begin recording. As noted, shutter activation as caused by button 24 may be provided with an optional self timer, or delay function to allow shutter activation to be initiated with a time delay, so as to allow the user a short time, e.g., 10 seconds, 5 seconds, 2 seconds, 1 second, or the like, to remove the control device from the picture if desired.

An image is then acquired (step 54), and the same will generally be akin to that which was imaged by the control device, and thus being of greater satisfaction to the user than pictures previously obtainable. In a video shot, a third control signal may be sent, stopping recording. The image acquisition will generally be performed by the control application on the control device controlling an aspect of the camera's native operating system or device's native application controlling camera operation.

In a next step, in some cases, the captured image may be transmitted to the control device for viewing (step 56). In other cases, the captured image may be retained on the camera, and the user may view the same on the camera. Generally, it may be preferable in certain implementations to allow viewing on the control device, so that the user need not leave the location of the subjects to view the captured image, and thus enabled to conveniently capture another image if the first is unacceptable.

Figure 5:
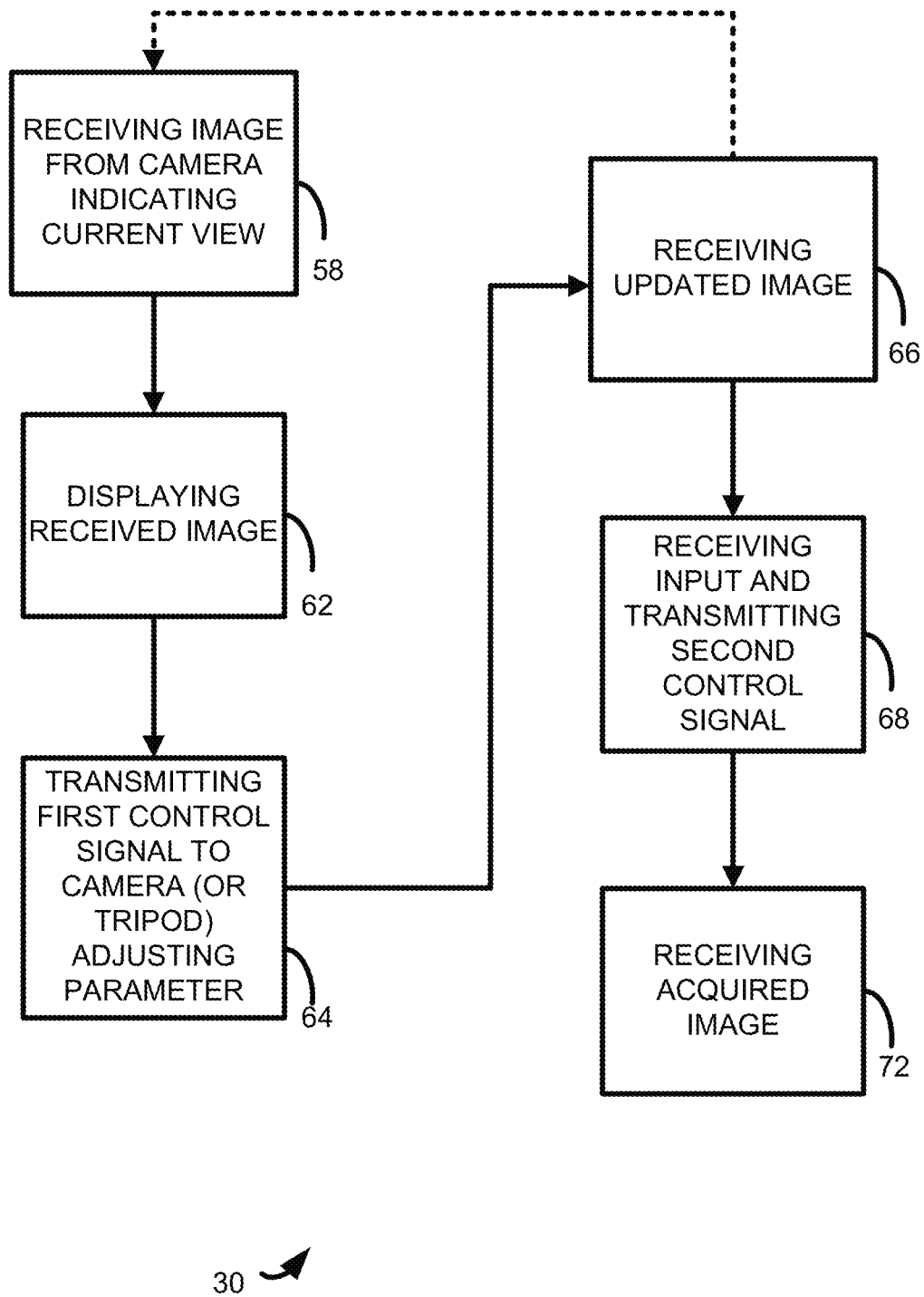
FIG. 5 is a flowchart of an exemplary method according to present principles, in particular illustrating control device operation.

FIG. 5 is a flowchart 30 showing exemplary steps performed by the control device 12. In a first step, an image is received from a camera indicating the current view (step 58). The image may be received in a number of ways, but is typically received using a wireless communications scheme, such as Bluetooth®, Wi-Fi, infrared, cellular, NFC, or the like. Wired communication schemes are also intended to be encompassed. The control device 12 may then display the received image (step 62). The control device 12 may display the received image on its own display or may send the image to another device for display.

Viewing and employing the image, the user then may position or reposition subjects for appropriate composition, e.g., including the user himself or herself. The user may also cause an adjustment of a camera parameter by adjusting a control on the control device 12. The user adjustment is transmitted to the camera by transmission of a first control signal (step 64). The first control signal may cause adjustment of a camera parameter directly in the camera (which may in turn be part of a mobile device, a dedicated camera system or the like) or the first control signal may be sent to a separate device which causes a change in the camera parameter. An example of such a mechanical device would be the motorized tripod noted above.

The updated image, caused by the adjustment of the camera parameter, is then transmitted to the control device for viewing by the user. The user can receive the image in the control device and, if desired, make additional changes or adjustments (dotted line). The received image may be a thumbnail or generally lower-resolution version of the view imaged by the camera. However, if bandwidth permits, or if certain detailed aspects are to be adjusted, as noted above, the received image may be the same as that imaged by the camera.

Once the image is deemed acceptable by the user, a user interface on the control device may receive an input from the user indicating that the picture is to be taken, i.e., the viewed image is to be captured or acquired and stored. The control device may receive the input on, e.g., the user interface of an application operating the remote camera control, or if the control device is a dedicated one, using the native operating system of the control device. The control device may then transmit a second control signal to the camera, causing image acquisition (step 68), e.g., through the native operating system or application controlling camera operation.

In some cases, as noted above, the time between the reception of the input on the user interface and the transmission of the second control signal may be configured to be non-negligible, thus instituting a time delay, and allowing the user to place the control device out of sight of the picture. In other cases, the camera device, and more particularly its controlling camera application, may institute such a time delay between reception of the second control signal and the shutter activation.

In yet other implementations, particularly for control devices with touchscreen inputs, the control application may be put in a state where a touch anywhere on the screen causes shutter activation. Thus, a user can obtain an acceptable view, and may then place the control device in such a mode, and may, e.g., hold the control device behind their person (or behind another person), and cause immediate shutter activation by pressing the touchscreen at any location (negating the need to look at the touchscreen for proper finger placement).

Once the camera has acquired the image, the same may be transmitted to the control device for display to the user (step 72). It should be noted that this step is optional, and that the image may also be viewed directly on the camera. However, this step provides certain benefits, including that the user need not move to the location of the camera to view the image.

While the discussion above has been described in terms of steps of adjustment, receiving an image, and further adjustment, leading to an image capture, it will be understood that such discussion is intended to be a breakdown of what is, in many implementations, a smooth process that appears to the user to just be a single step. The user will in many implementations receive the image from the camera in a control device, and will continuously or semi-continuously adjust the camera parameters (or adjust subject(s) positioning) until the image on the control device looks acceptable, and will then capture the image, i.e., take the picture.

Figure 6:
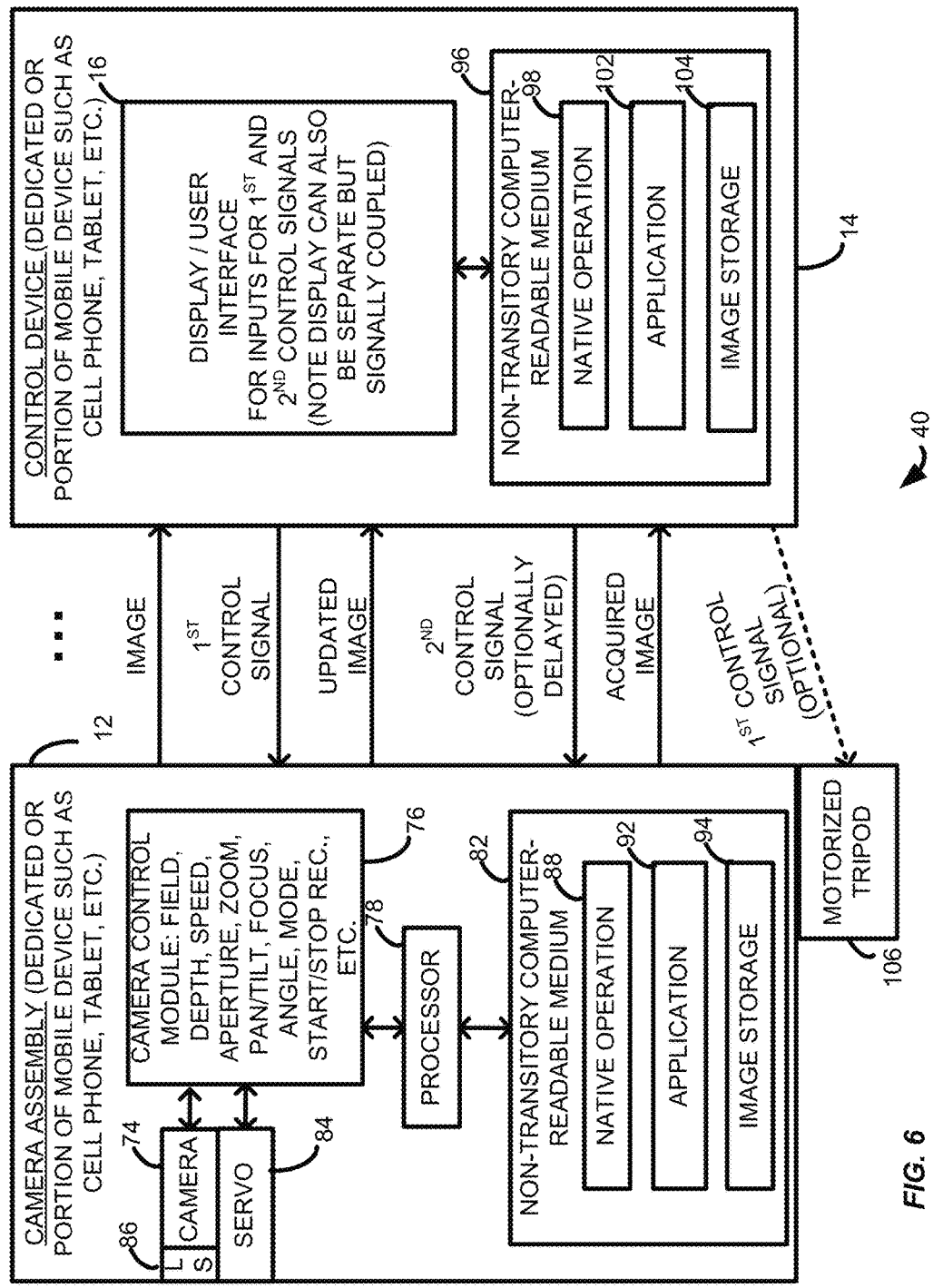
FIG. 6 is a logical diagram illustrating an exemplary camera assembly and control device according to present principles.

FIG. 6 illustrates additional details about a camera or camera assembly 12 and a control device 14. The camera or camera assembly 12 includes a physical camera 74, which is controlled by a camera control module 76. The camera control module 76 may include a camera control application, which resides on a non-transitory computer readable medium 82. The camera control module 76 controls aspects and parameters of the operation of the camera 74, including, e.g., one or more of depth of field, field of view, angle of view, shutter speed, aperture, zoom, focus, shooting mode, pan and tilt parameters, shutter activation, the starting and stopping of recording video, and the like. The camera control module performs such functions as dictated by the application 92 through a processor 78. In cases where the camera assembly is a dedicated camera, e.g., a digital SLR or an attachment which couples to an analog SLR, then the "application" may be replaced with the native operating system of the camera device. The non-transitory computer readable medium 82 may also include an area for image storage 94. The non-transitory computer readable medium 82 may further include an application (not shown) to reduce the size of the image for subsequent transmission to the control device 14. In this way, bandwidth requirements may be substantially reduced.

The camera 74 can be fixed or the same may be movable within the body of the camera assembly by a servo motor 84. As noted above, in some cases, the camera 74 is stationary within the (also stationary) camera assembly 12 while a moving lens servo motor 86 serves to provide adjustments from the control device 14. In other cases, the servomotor 84 and the lens servo motor 86 work together to accomplish the adjustments.

In yet other cases, the control device 14 may provide signals for pan and tilt functionality through a motorized tripod 106.

Turning to the control device 14, the same may include a display 16, such as to display images from the camera and to provide a user interface for inputs for the first and second control signals. Where a physical keyboard is provided, the physical keyboard may be used as well for inputs for the first and second control signals. In some cases, the display may be on a different display device, e.g., a large screen TV, and in this case appropriate functionality (in software, hardware, or firmware) may be provided to transmit the image to the separate device. In some cases, the control device 14 may serve to coordinate the transfer of the image which may be sent directly from the camera to the separate device. The control device 14 may incorporate appropriate programming, e.g., on a non-transitory computer readable medium 96, to accomplish such functionality.

The non-transitory computer readable medium 96 may further include an application 102 to operate control functionality for a camera as described. Where the control device 14 is a dedicated device, the "application" may be replaced with a native operating system 98 of the dedicated device. The control device 14 may further include within non-transitory computer readable medium 96 an area for image storage 104, where not only are received images temporarily stored and used to compose acceptable images (according to methods above) but the captured images are also more permanently stored on the control device. In this case, the stored images will generally be of the same fidelity as the images received for use during photo composition (e.g., original image, updated image, and the like (although this is not a requirement)). Such an implementation may be particularly useful where the control device has substantially more storage available than the camera device.

FIG. 6 also shows a simplified sequence diagram illustrating images, updated images, acquired images, and first and second control signals as described above.

Systems and methods according to present principles allow remote operation of a camera, in particular remote control of various parameters, remote image viewing, and remote shutter activation, thus advantageously allowing sophisticated camera control where a user is away from the camera, such control not previously obtained.

Other variations are also possible and will be readily apparent to those of skill in the art in light of this new disclosure. For example, while various settings have been described as part of a control functionality, it will be understood that a subset of settings may be employed to provide the handshaking functionality between the camera and the control device. For example, where the camera and control device are both using an industry-standard or otherwise common control protocol, communications between the two may be clear. However, if the camera and control device are from different manufacturers, employing different types of operating systems, then a more complex ad hoc pairing protocol, including authentication, may be employed to allow communications.

In more detail, if both devices are using an industry-standard communications protocol and interface, then operations on the control device may be very similar to operations on the camera itself. In fact, the control device interface may be a clone of that on the camera device. The manufacturer of each device may simply implement the industry-standard within their code. The same may be true if both devices are from th\e same manufacturer, as again a common protocol and interface (if not generation of protocol and interface) may be employed. If there is no industry-standard, and if different types of operating systems, communications, protocols, and interfaces are employed on the different devices, then an appropriate application would be necessary to convert control signals from the control device to a form in which the same are meaningful to the camera. In some cases all of the functionality may be enabled. In other cases, only a subset of the functionality may be enabled.

This implementation may provide a particularly interesting system where both are dedicated cameras. In this case, e.g., a digital SLR from one manufacturer may be controlled by a digital SLR from another manufacturer. Such may have the advantage that a user, skilled in the interface of one SLR, may be enabled to operate the interface of another SLR without learning the new interface. This functionality would be enabled by having a camera control application include a mapping of the interface from one SLR to the other. For example, an aperture control on the first SLR could be mapped to that of the other.

In the same way, a "power user" of an SLR may be enabled to control camera phone functionality, using the more powerful interface of the SLR, and negating the need to navigate through a more tedious menu system of the cell phone camera. The converse may also be true, where a slower but more intuitive cell phone interface may be leveraged to control complicated functionality of a digital SLR. In the first alternative, the more complicated and expensive SLR may be employed to control a more inexpensive "point-and-shoot" camera, particularly where the more inexpensive camera is disposed in a dangerous location.

As another variation, and as noted above, various shooting modes may be employed, and the control could vary depending on the type of mode. For example, one mode may be only for composition, in which case a low bandwidth image may be employed to simply see the general layout of the subjects. Another mode may be for more detailed work, in which case higher resolution images requiring higher bandwidth may be employed. Such images may be transmitted on a less frequent basis than the low resolution images, but generally so long as they are frequent enough for image analysis, the same may be useful to the photographer.

The control device may be part of a head mounted display, such as may be implemented in eyeglasses, and using voice recognition for a user interface for the first and second control signals.

In yet another variation, the controlling device may have intelligence incorporated so as to, e.g., recognize faces. Such intelligence may be employed to implement a "smile shutter" on the controlling device by triggering an image capture when the controlling device detects that certain conditions are met in the view, which in the case of a "smile shutter" would be that there is a smiling face in the picture. Other conditions may include that the controlling device analyzes the image and, when a bird or animal is completely in the frame, may trigger an image acquisition. Similarly, the controlling device may determine that the subject of the image is in a particular portion of the view, and may instruct the camera to focus on that portion of the view.

One implementation includes one or more programmable processors and corresponding computer system components to store and execute computer instructions and data, such as to provide the structures, systems, and interfaces to provide the camera control system. One such computing environment is disclosed below.

Figure 7:
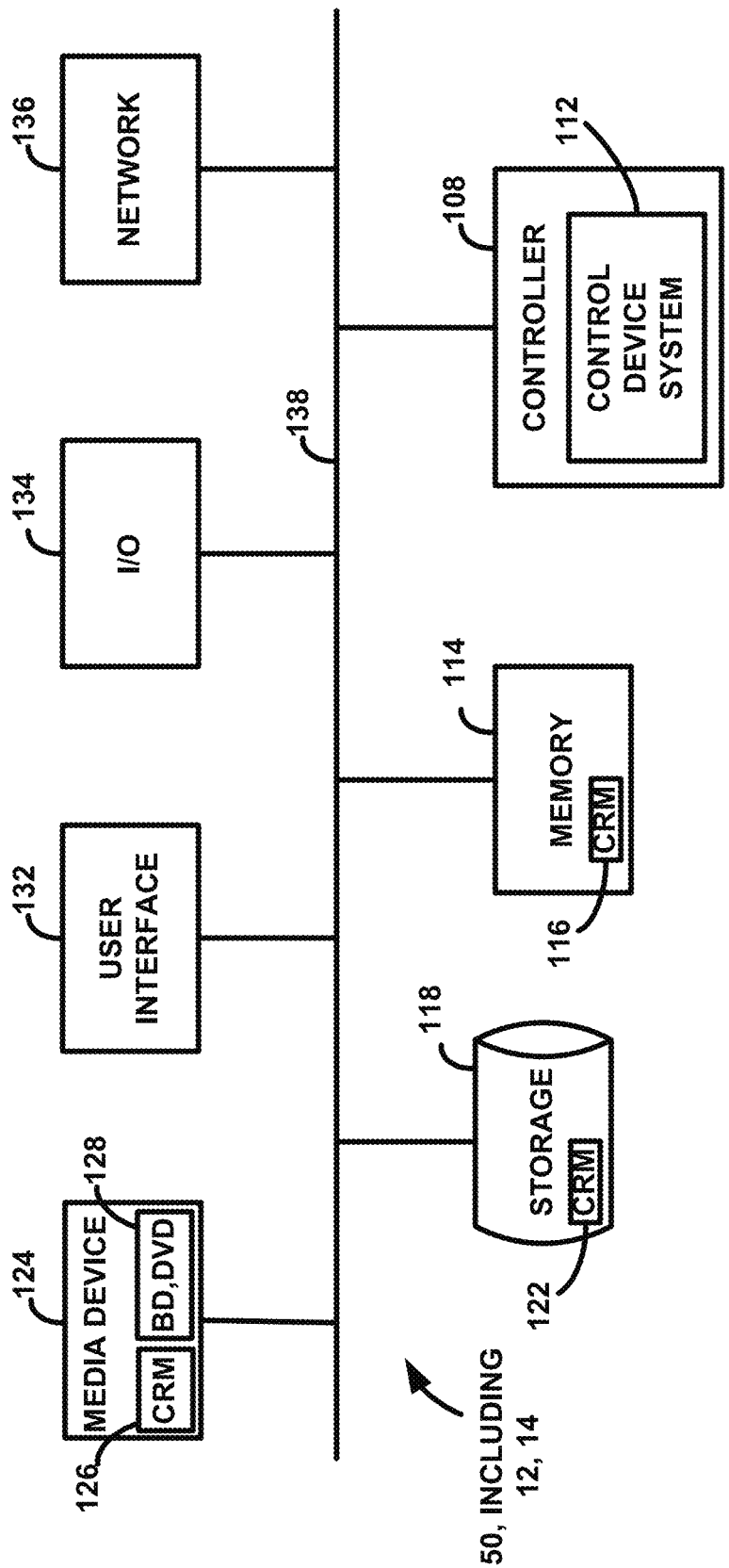
FIG. 7 is a schematic diagram of an exemplary computing environment according to present principles, which may embody the camera or control device or other computing systems described here.

Referring to FIG. 7, a representation of an exemplary computing environment 50 in which the system and method may be implemented is illustrated.

The computing environment 50 includes a controller 108, a memory 114, storage 118, a media device 124, a user interface 132, an input/output (I/O) interface 134, and a network interface 136. The components are interconnected by a common bus 138. Alternatively, different connection configurations can be used, such as a star pattern with the controller at the center.

The controller 108 includes a programmable processor and controls the operation of a camera remote control system 112. The controller 108 loads instructions from the memory 114 or an embedded controller memory (not shown) and executes these instructions to control the system.

Memory 114, which may include non-transitory computer-readable memory 116, stores data temporarily for use by the other components of the system. In one implementation, the memory 114 is implemented as DRAM. In other implementations, the memory 114 also includes long-term or permanent memory, such as flash memory and/or ROM.

Storage 118, which may include non-transitory computer-readable memory 122, stores data temporarily or long-term for use by other components of the system, such as for storing data or instructions. In one implementation, the storage 118 is a hard disc drive, a solid state drive, or cloud storage.

The media device 124, which may include non-transitory computer-readable memory 126, receives removable media and reads and/or writes data to the inserted media. In one implementation, the media device 124 is an optical disc drive or disc burner, e.g., a writable Blu-ray® disc drive 128.

The user interface 132 includes components for accepting user input, e.g., the user indication of control parameters and shutter activation, resulting in the first and second control signals, as well as a display for reviewing images from the camera. The controller 108 uses inputs entered by the user to adjust the operation of the computing environment.

The I/O interface 134 includes one or more I/O ports to connect to corresponding I/O devices, such as external storage or supplemental devices, e.g., a printer or a PDA. In one implementation, the ports of the I/O interface 134 include ports such as: USB ports, PCMCIA ports, serial ports, and/or parallel ports. In another implementation, the I/O interface 134 includes a wireless interface for wireless communication with external devices, e.g., to and from a camera assembly. These I/O interfaces may be employed to connect to one or more content playback devices.

The network interface 136 allows connections with the local network and includes a wired and/or wireless network connection, such as an RJ-45 or Ethernet connection or Wi-Fi interface (802.11). Numerous other types of network connections will be understood to be possible, including WiMax, 3G or 4G, 802.15 protocols, 802.16 protocols, satellite, Bluetooth®, or the like.

The system may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

The methods shown and described above may be implemented in one or more general, multi-purpose, or single-purpose processors. Unless specifically stated, the methods described herein are not constrained to a particular order or sequence. In addition, some of the described methods or elements thereof can occur or be performed concurrently.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be appreciated that particular configurations of the operating environment may include fewer, more, or different components or functions than those described. In addition, functional components of the operating environment may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be construed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

In general, the systems and methods according to present principles may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, are loaded into random access memory. Inputs to the application, e.g., from the plurality of users or from any one user, may be by any number of appropriate computer input devices. For example, users may employ a keyboard, mouse, touchscreen, joystick, trackpad, other pointing device, or any other such computer input device to input data relevant to the calculations. Data may also be input by way of an inserted memory chip, hard drive, flash drives, flash memory, optical media, magnetic media, or any other type of file-storing medium. The outputs may be delivered to a user by way of a video graphics card or integrated graphics chipset coupled to a display that maybe seen by a user. Alternatively, a printer may be employed to output hard copies of the results. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., personal computers, laptop computers, notebook computers, net book computers, handheld computers, personal digital assistants, mobile phones, smart phones, tablet computers, and also on devices specifically designed for these purpose. In one implementation, a user of a smart phone or wi-fi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method. In the below system where an input to a camera is contemplated, the plural inputs may allow plural users to input relevant control signals at the same time.

The invention claimed is:

1. A method for remotely operating a camera within a portable housing, comprising:
   a. transmitting an image from a camera within a portable housing for display at a mobile control device, the image indicating a current view;
   b. receiving a first control signal from the mobile control device, wherein the first control signal indicates an adjustment to the current view by adjusting either pan, tilt, or a combination;
   c. adjusting the current view according to the first control signal by controlling a camera parameter, wherein the adjusting adjusts either pan, tilt, or a combination, and wherein the adjusting is performed by moving the camera relative to the portable housing;
   d. receiving a second control signal from the mobile control device, the second control signal requesting an image acquisition; and
   e. causing an acquisition of an image.

2. The method of claim 1, further comprising transmitting the acquired image to the mobile control device.

3. The method of claim 1, wherein the steps are performed by an application running on the camera.

4. The method of claim 1, wherein the adjusting includes controlling a native operating system of the camera or controlling a camera operation application running on the camera.

5. The method of claim 1, wherein the first control signal is further configured to adjust the current view by adjusting zoom.

6. The method of claim 1, wherein the adjusting is performed by moving a lens relative to an image sensor and the housing.

7. The method of claim 1, wherein the first control signal further adjusts the current view by adjusting a parameter selected from the group consisting of: shutter speed, aperture, angle of view, field of view, position, depth of field, focus, ISO sensitivity, exposure compensation, flash operation, digital processing, or combinations of these.

8. The method of claim 1, wherein the receiving a second control signal and the acquiring is separated by a predetermined period of time.

9. The method of claim 8, wherein the predetermined period of time is between about 2 and 10 seconds.

10. A non-transitory computer-readable medium, comprising instructions for causing a computing environment to perform the method of claim 1.

11. A method for remotely operating a camera, comprising:
   a. receiving an image from a camera within a portable housing, the image indicating a current view;
   b. displaying the received image;
   c. transmitting a first control signal to the camera, the first control signal adjusting a parameter of the camera, wherein the parameter is either pan, tilt, or a combination, wherein the adjusting is performed by moving the camera relative to the portable housing;
   d. receiving an updated image of the current view as modified by the adjusted parameter caused by the first control signal; and
   e. receiving an input and in response to the input transmitting a second control signal to the camera, the second control signal requesting an image acquisition.

12. The method of claim 11, further comprising receiving the acquired image from the camera.

13. The method of claim 11, wherein the first and second control signals are configured to deliver commands to a native operating system of the camera.

14. The method of claim 11, wherein the first and second control signals are configured to deliver commands to an application operating the camera.

15. The method of claim 11, wherein the first and second control signals are transmitted at least in part by an application running on a mobile control device.

16. The method of claim 11, wherein the first and second control signals are transmitted at least in part by a native operating system of a mobile control device.

17. The method of claim 11, wherein the first control signal is further configured to adjust operation of the camera by adjusting a parameter selected from the group consisting of: zoom, shutter speed, aperture, angle of view, field of view, position, depth of field, focus, or combinations of these.

18. The method of claim 11, further comprising transmitting the second control signal a predetermined period of time following the receiving an input.

19. The method of claim 18, wherein the predetermined period of time is between about 2 and 10 seconds.

20. A non-transitory computer-readable medium, comprising instructions for causing a computing environment to perform the method of claim 11.

21. A system, comprising:
a. a first non-transitory computer readable medium, comprising instructions for causing a camera within a portable housing to perform the following steps:
  i. receiving a first control signal from a mobile control device, wherein the first control signal adjusts the current view by adjusting either pan, tilt, or a combination;
  ii. adjusting operation of the camera according to the first control signal, wherein the adjusting adjusts either pan, tilt, or a combination, wherein the adjusting is performed by moving the camera relative to the portable housing; and
  iii. receiving a second control signal from the mobile control device, the second control signal requesting an image acquisition; and
b. a second non-transitory computer readable medium, comprising instructions for causing a mobile control device to perform the following steps:
  i. receiving an image from the camera;
  ii. displaying the image from the camera;
  iii. providing a user interface to receive a first input, the first input to adjust the operation of the camera;
  iv. transmitting the first input as the first control signal to the camera;
  v. providing a user interface to receive a second input, the second input to cause the camera to acquire an image;
  vi. transmitting the second input as the second control signal to the camera;
  vii. receiving the acquired image from the camera; and
  viii. displaying the acquired image from the camera.

22. The system of claim 21, wherein the camera is part of a mobile device.

23. The system of claim 22, wherein the mobile device is a mobile phone.

24. The system of claim 21, wherein the control device is a mobile device.

25. The system of claim 24, wherein the mobile device is a mobile phone.

26. The system of claim 21, wherein the camera and the mobile control device are on a common network or are in data communication via a radio frequency communication scheme.

\* \* \* \* \*